(12) United States Patent
Liu et al.

(10) Patent No.: US 6,212,759 B1
(45) Date of Patent: Apr. 10, 2001

(54) AUTOMATED ASSEMBLY DEVICE FOR ASSEMBLY OF COMPONENTS OF A DISC DRIVE

(75) Inventors: Dan Liu, Bloomington; Michael W. Pfeiffer, Richfield, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/023,541

(22) Filed: Feb. 13, 1998

Related U.S. Application Data
(60) Provisional application No. 60/061,723, filed on Oct. 10, 1997.

(51) Int. Cl.[7] ............................................. B11B 5/127
(52) U.S. Cl. .................................... 29/603.03; 29/603.04; 360/104
(58) Field of Search ........................ 29/603.03, 603.04, 29/737; 360/104, 105, 106

(56) References Cited

U.S. PATENT DOCUMENTS

| | | | |
|---|---|---|---|
| 3,968,501 | * 7/1976 | Gilbert | 354/7 |
| 4,215,922 | * 8/1980 | Szabo et al. | 354/5 |
| 5,060,099 | * 10/1991 | Yeager et al. | 360/105 |
| 5,249,254 | * 9/1993 | Murphy et al. | 388/907 |
| 5,661,615 | * 8/1997 | Waugh et al. | 360/75 |
| 5,706,574 | * 1/1998 | Shimanuki | 29/603.3 |

* cited by examiner

Primary Examiner—Lee Young
Assistant Examiner—Sean Smith
(74) Attorney, Agent, or Firm—Westman, Champlin & Kelly, P.A.

(57) ABSTRACT

An assembly device for assembling components of a disc drive, the assembly device being adapted to assembly components of a disc drive supported at a disc drive station. The assembly members are operably supported for operation between a load position and an install position aligned with the disc drive station. Components are engaged by the assembly members and transported to the disc drive station. At the disc drive station, the components are aligned for assembly in the disc drive.

18 Claims, 16 Drawing Sheets

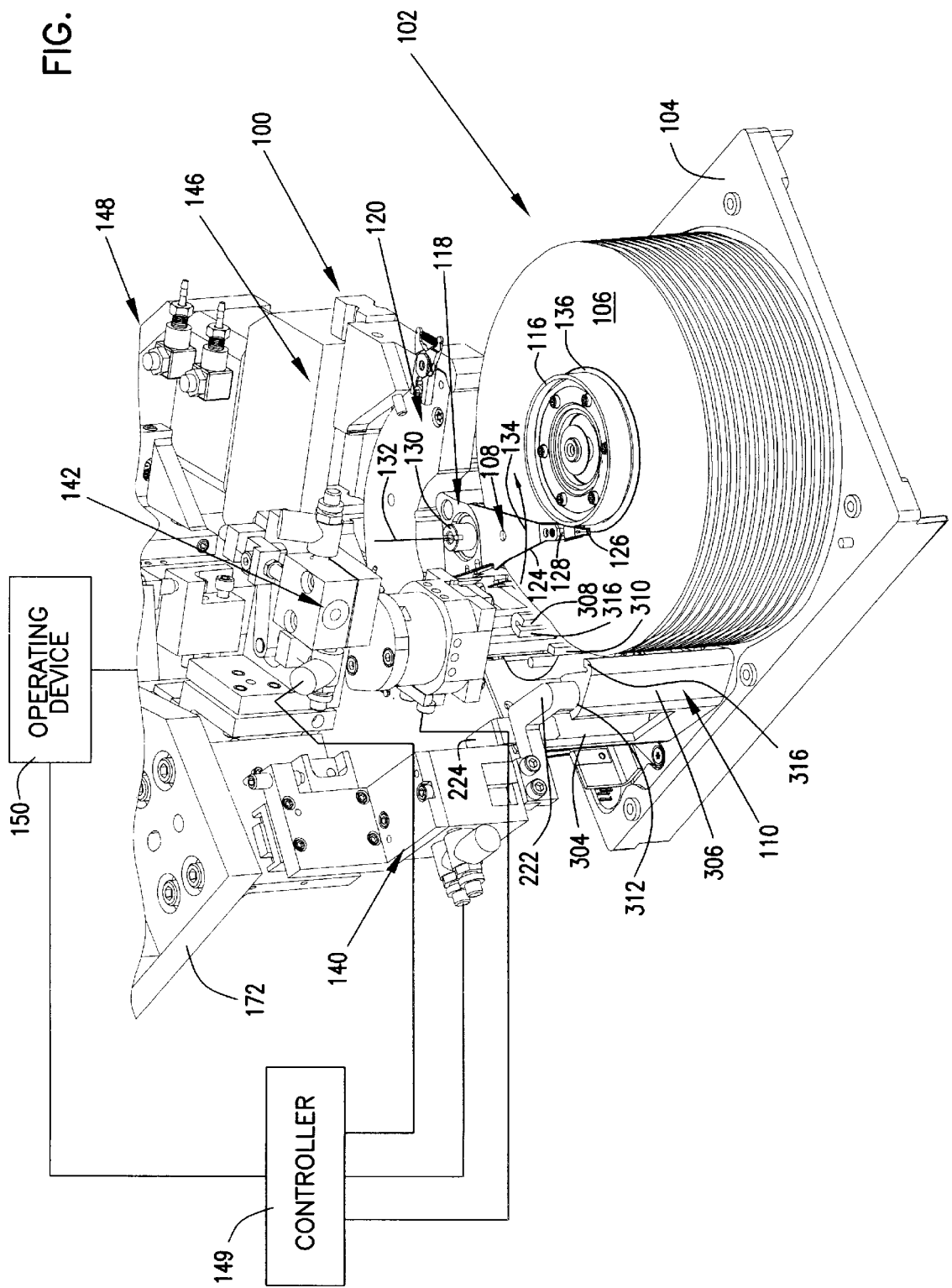

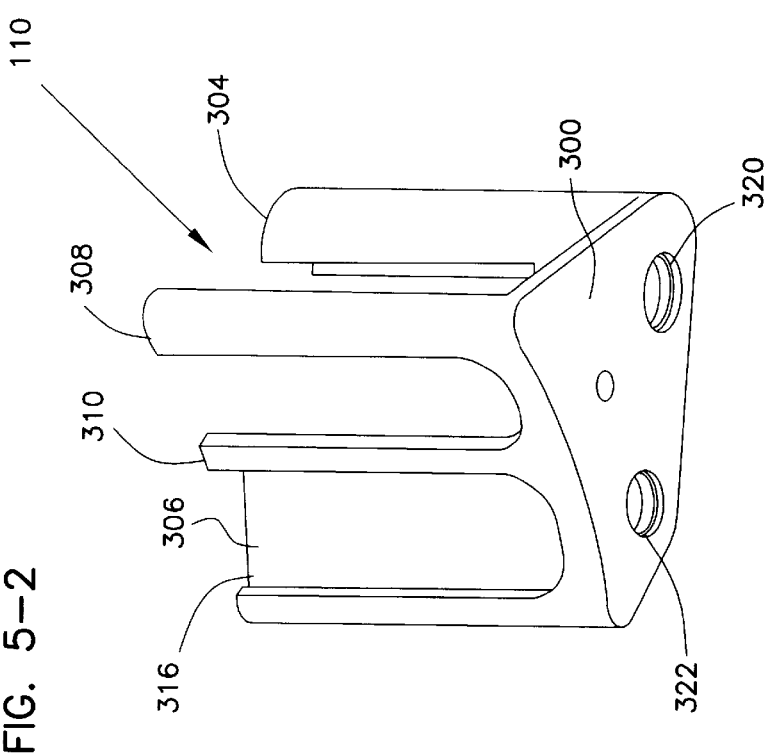

AUTOMATED ASSEMBLY DEVICE FOR ASSEMBLY OF COMPONENTS OF A DISC DRIVE

CROSS-REFERENCE TO RELATED APPLICATION

This application claims priority to Provisional Application Ser. No. 60/061,723, filed Oct. 10, 1997, and entitled "LATCH/MAGNET/FILTER HOUSING INSTALL TOOL."

FIELD OF THE INVENTION

The present invention relates to a device for assembling components of a disc drive. In particular, the present device relates to automated assembly of a plurality of assembly components of a disc drive.

BACKGROUND OF THE INVENTION

Disc drives are well known which store digital information on magnetic or other discs. Heads carrying transducer elements are supported relative to the discs for reading and writing data to and from the discs. Heads are supported via an actuator assembly including an actuator block supporting a plurality of actuator arms aligned relative to the discs. Rotary-type actuators are known which include an actuator block rotationally coupled to a chassis of the disc drive for rotationally supporting heads relative to the disc surface. The head includes sliders which are coupled to suspension assemblies supported via actuator arms of the actuator block. Rotation of the disc creates a hydrodynamic lifting force via an air bearing surface of the slider. Rotation of the disc interacts with the air bearing surface on the slider to cause the slider to rise and fly above the disc surface for read and write operations.

The actuator block is rotated along an arcuate path for placement of the heads relative to selected data tracks. Rotation of the actuator block is effected via a voice coil motor which includes a magnet-and-backiron assembly and a coil bobbin coupled to the actuator block in a known manner. The discs include a landing zone for placement of the heads to park the heads of the disc drive when the disc drive is not in operation. The actuator block is secured in a nonoperational position so that the slider contacts the landing zone prior to and upon completion of operation of the disc drive. The actuator block is secured in the nonoperational position via a latching assembly including a latch coupled to the actuator block and a latch assembly coupled to the chassis of a disc drive. Control circuity is coupled to heads of the disc drive and to the voice coil motor for placement of the heads relative to the disc surface. Circuitry of the disc drive is also coupled to a spindle motor for rotating discs to read and write data.

Typically, a cover encloses the operational components of the disc drive. The cover includes pressure holes to balance the internal pressure of the disc drive with ambient pressure. In order to restrict debris and other particles from entering the disc drive via holes, filters are placed in proximity to said holes to limit the flow of dust and debris into the cavity of the disc drive. The components of the disc drive are very small, and operation requires precision placement of the heads relative to selected data tracks. Thus, the components of the disc drive must be accurately assembled for precision operation. Disc drives are typically assembled in "clean rooms" to limit exposure to dust and debris. In prior assembly operations, various individual components of the disc drive were manually and individually assembled into the disc drive to assure proper assembly for precision operation. Although this assures quality control, such assembly is time-consuming and increases the production costs of the disc drive. Thus, it is desirable to provide an easy and simplified assembly procedure for components of the disc drive which provides desired precision assembly. The present invention addresses these and other problems, and offers other advantages over the prior art.

SUMMARY OF THE INVENTION

The present invention relates to an assembly device for assembling components of a disc drive. The assembly device is adapted to assembly components of a disc drive supported at a disc drive station in an automated operation. The assembly device is operably supported for operation between a load position and an install position aligned with a disc drive station. Components are engaged by an assembly device and transported to the disc drive station. At the disc drive station, the components are aligned for assembly. In the preferred embodiment illustrated, the assembly device includes a filter housing assembly member, a latch base assembly member, and a magnet-and-backiron assembly member for simultaneously assembling the filter housing, latch assembly, and magnet and backiron components of the disc drive.

BRIEF DESCRIPTION OF THE DRAWINGS

FIG. 1 is a detailed perspective view of an embodiment of an assembly device of the present invention for assembling components of a disc drive as shown.

FIGS. 3-1 and 3-2 comparatively illustrate operation of the assembly device of FIG. 1 between a load position for loading components and an assembly position aligned with an unassembled disc drive for installing components.

FIGS. 5-1 and 5-2 are perspective views of an embodiment of a filter housing assembled via an assembly member of the embodiment of the assembly device illustrated in FIG. 1.

FIGS. 15-1 and 15-2 are flow charts illustrating operation of an embodiment of an assembly device of the present invention.

DETAILED DESCRIPTION OF THE PREFERRED EMBODIMENTS

Figure 2:
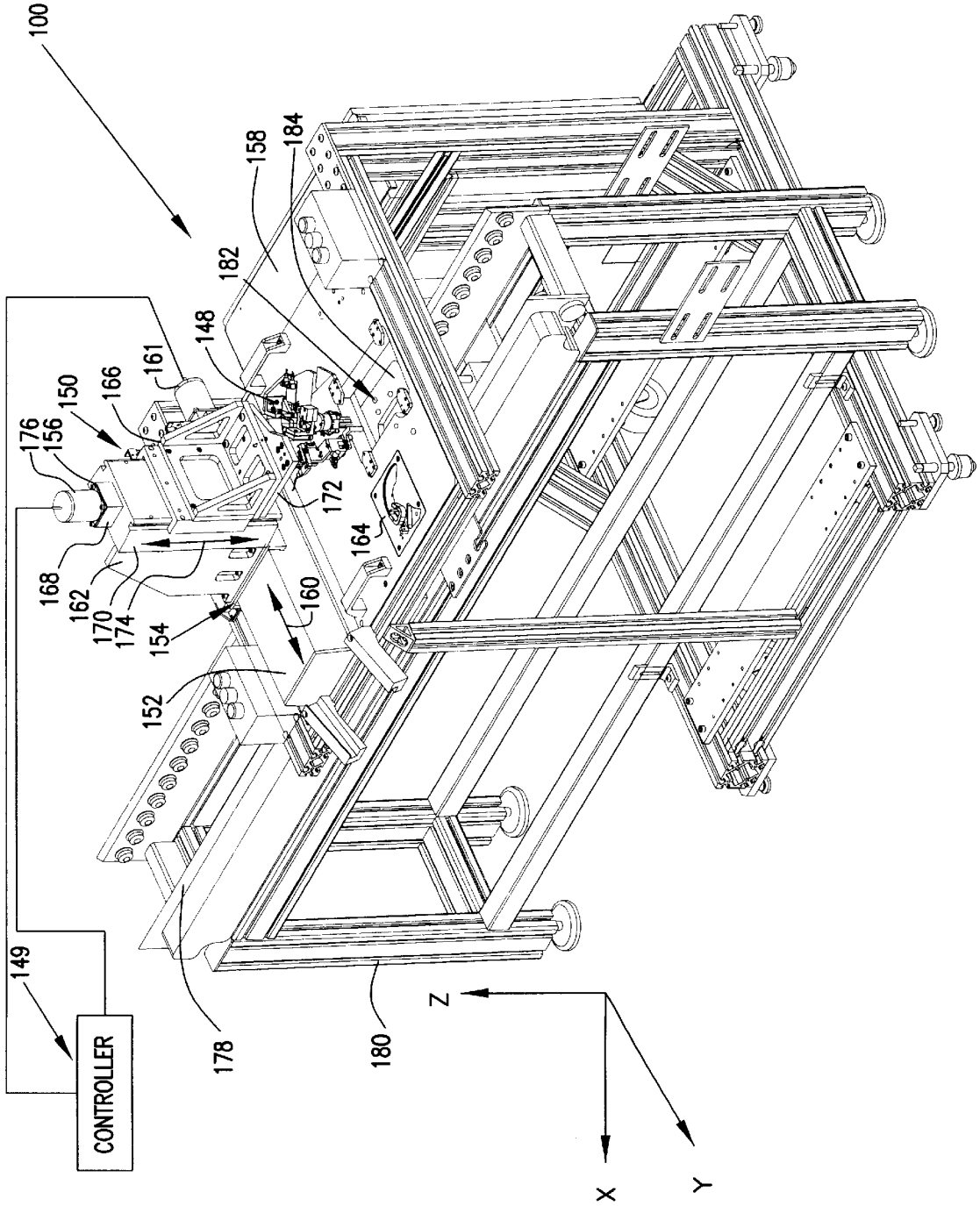
FIG. 2 is a perspective view of the embodiment of the assembly device illustrated in FIG. 1, shown in cooperation with a conveyor system, for assembling disc drives.

The present invention relates to an automated assembly device 100 for assembling components of a disc drive 102. As shown, disc drive 102 includes base 104, disc stack 106, a rotary actuator assembly 108, and a filter housing 110. Disc stack 106 includes a plurality of discs rotationally coupled to base 104 via a spindle motor (not shown) having an upper clip 116. Actuator assembly 108 includes an actuator block 118 rotationally coupled to base 104 and operated via a voice coil motor including a magnet-and-backiron assembly 120 and a coil bobbin (not shown) coupled to actuator block 118. Actuator block 118 includes actuator arms 124, which support heads 126 (including transducer elements), coupled thereto via a suspension assembly 128 in a known manner for read and write operations.

Actuator block 118 is rotationally coupled via a bearing 130 to base 104 of the disc drive to rotate about axis 132, as illustrated by arrow 134. Actuator block 118 operates via the voice coil motor for placement of heads 126 relative to selected data tracks in a known manner. Current is supplied to the coil bobbin, which operates in a permanent magnetic field provided by magnet-and-backiron assembly 120 to rotate actuator block 118. When the disc drive is not in operation, actuator block 118 is positioned to align heads 126 in a landing zone 136 on the disc surface. While the disc drive is not in operation, heads 126 are maintained in landing zone 136 via cooperation of a latch assembly (not visible in FIG. 1). Filter housing 110 supports a filter (not shown) to limit exposure of the disc drive components to dust and particles through pressure holes on the cover (not shown) of the disc drive.

Automated assembly device 100 of the present invention is designed to simultaneously assemble filter housing 110, magnet-and-backiron assembly 120, and the latch assembly, as will be explained. Automated assembly device 100 includes a filter assembly member 140, a latch assembly member 142, and a magnet-and-backiron assembly member 146. The assembly members position each of the disc drive components for assembly to the disc drive as will be explained. Assembly members 140, 142, 146 cooperatively form an assembly train 148, operated via a central controller 149.

The assembly train 148 is coupled to an operating device 150, coupled to controller 149 for operation. As shown in FIG. 2, operating device 150 includes a track 152, a slide 154, and a lift assembly 156. Track 152 is supported via an assembly base 158. Slide 154 is movable along track 152, as indicated by arrow 160, via a stepper motor 161 coupled to controller 149. Lift assembly 156 is coupled to slide 154 via a bracket 162 and is movable therewith along track 152. Assembly train 148 is coupled to lift assembly 156 and is movable and operable thereby. Slide 154 moves along track 152 along the -x- axis, as illustrated by arrow 160, to position assembly train 148 between a parts nest 164 and a disc drive supported at a disc drive station for assembly, as will be explained.

Lift assembly 156 includes a lift 166 and a lift track 168. Lift track 168 is formed on a lift block 170, coupled to slide 154 via bracket 162. Assembly train 148 is coupled to lift 166 via a mounting plate 172 and, thus, is movable therewith along the -z- axis, as illustrated by arrow 174, for raising and lowering assembly train 148. Lift 166 is moved along lift track 168 via a stepper motor 176, operably coupled to controller 149. Thus, assembly train 148 is movably supported for movement along an -x- axis via slide 154, and relative to a -z- axis via lift 166.

As shown in FIG. 2, assembly device 100 is incorporated into a conveyor assembly for assembling specific components of the disc drive movable along a conveyor 178. Preferably, conveyor 178 is supported by support legs 180. Disc drives are lifted from conveyor 178 to align with assembly base 158 for assembly of components by assembly train 148. Disc drives are lifted via a disc drive lift or conveyor lift assembly 182. As previously explained, assembly train 148 moves along the -x- axis via slide 154 between a load position, aligned with parts nest 164; and an assembly position, aligned with a disc drive supported at a disc drive station by the disc drive lift assembly 182, as comparatively illustrated in FIGS. 3-1 and 3-2. Assembly parts are supported in nest 164 for assembly by device 100.

Figures 1, 3:
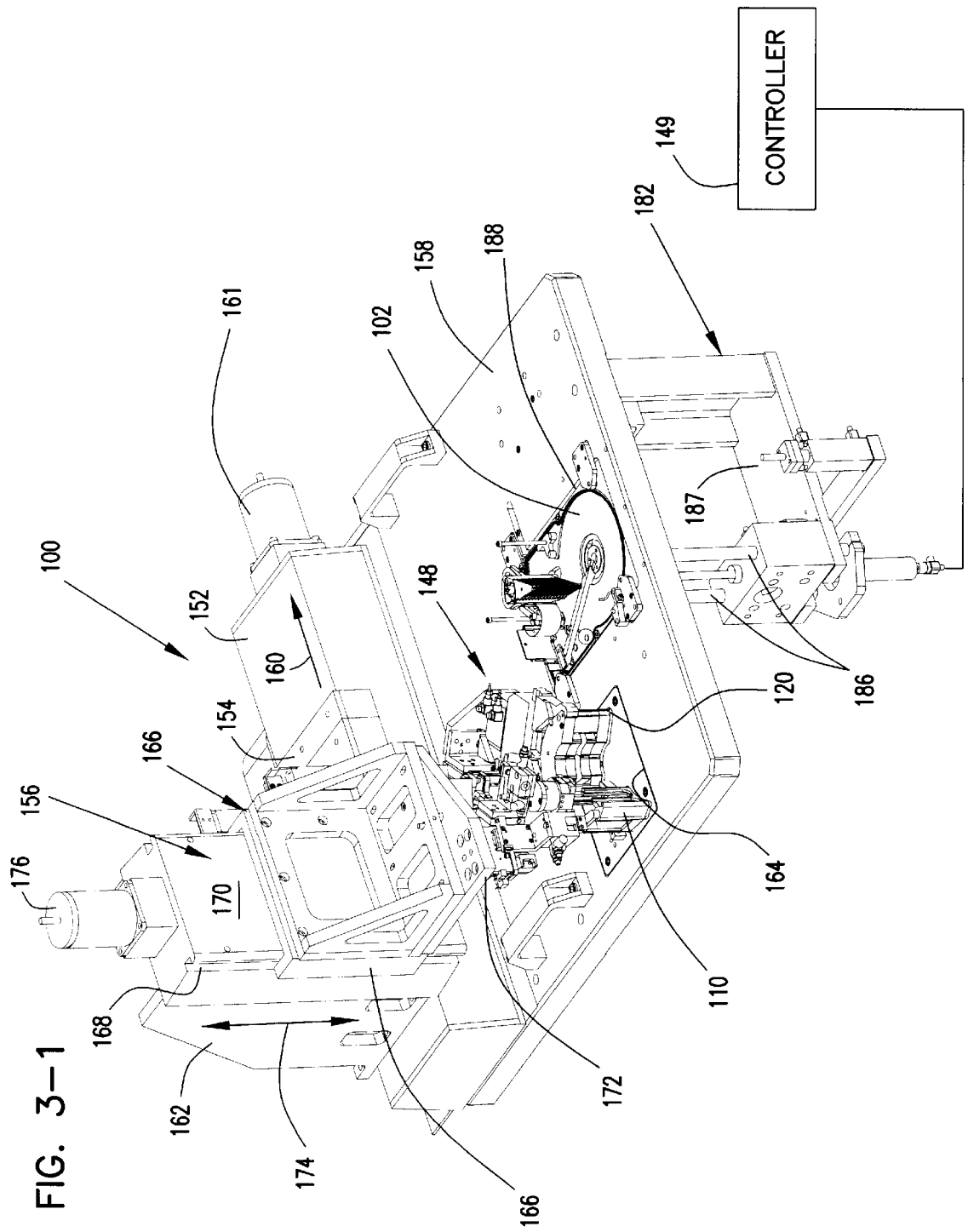
Figures 2, 3:
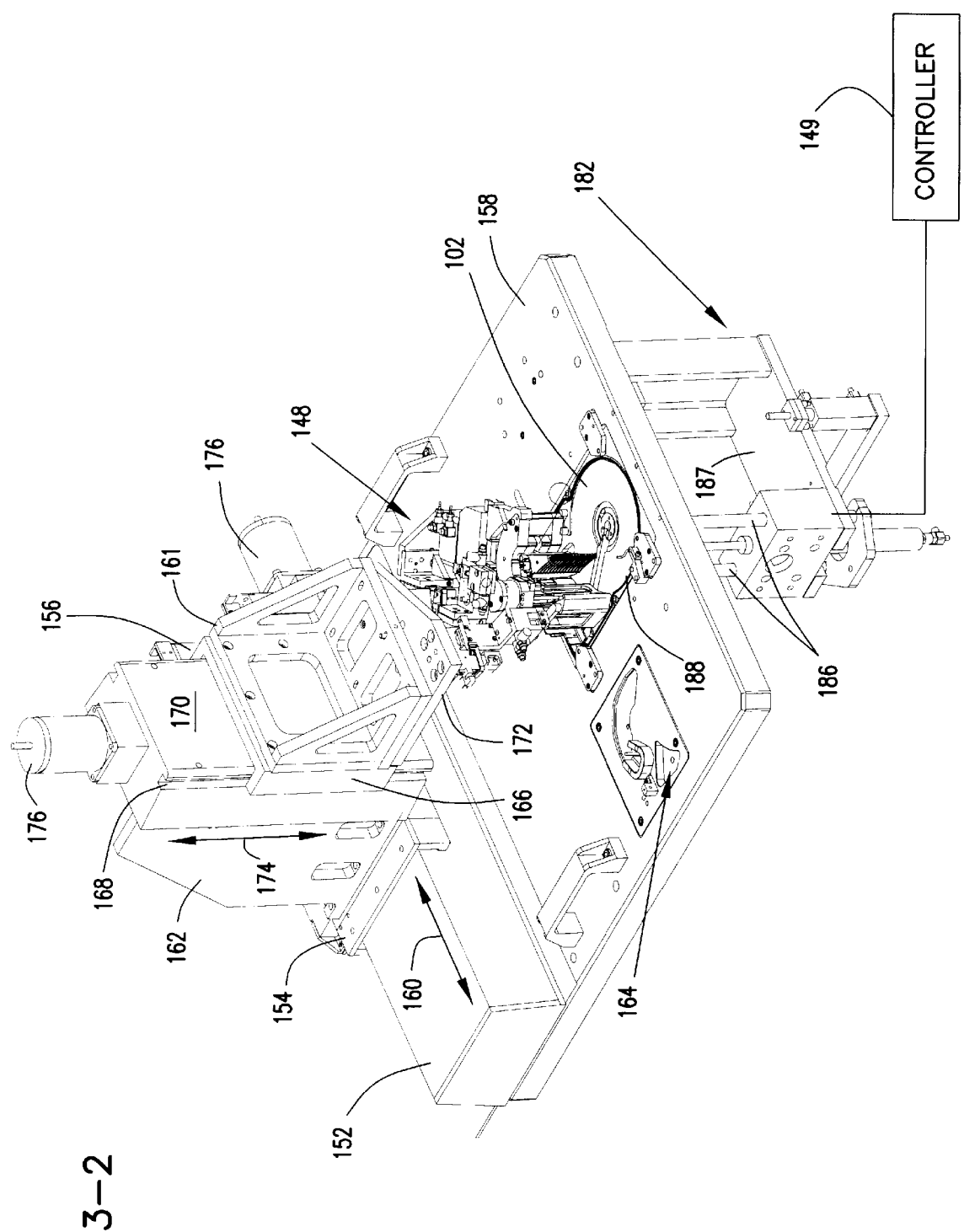

In particular, as shown in FIG. 3-1, slide 154 is moved along track 152 to position assembly train 148, relative to nest 164, in the load position to load components from nest 164 for assembly. The components are stored in a predefined pattern in nest 164, aligned with the operational components (e.g., filter housing assembly member 140, latch assembly member 142, and backiron assembly member 146) of assembly train 148. When assembly train 148 is located in the load position, the train is lowered via operation of lift 166, movable along track 168, to align with components supported in nest 164. Individual assembly members 140, 142, 146 are designed to grip the assembly components. Once the assembly components are gripped by the assembly members of assembly train 148, lift 166 is raised for movement of assembly train 148 to the assembly position for alignment with a disc drive as shown in FIG. 3-2.

Disc drive lift assembly (or conveyor lift) 182 includes a disc drive support plate 184 (shown in FIG. 2) operably coupled to lift rods 186, coupled to frame 187. The disc drive support plate 184 is aligned with conveyor 178, supporting disc drives, and is operable between a raised position and a lowered position. In the lowered position (not shown), disc drive support plate 184 is aligned with the disc drive supported on conveyor 178. Support plate 184 is raised via lift rods 186 to a raised position (shown). In the raised position, disc drive support plate 184 raises the disc drive for alignment relative to assembly base 158 of assembly device 100. Preferably, lift rods 186 are pneumatically raised and lowered and are coupled to controller 149 for operation. An opening 188 extends through base 158 and is sized relative to disc drive support plate 184 so that disc drive support plate 184 may be raised for alignment with base 158 for assembly of the disc drive.

Prior to a cycle of operation, an operator loads assembly components into nest 164. Preferably, nest 164 is a molded plate including recessed portions shaped to receive the various assembly components loaded in a prearranged order for alignment relative to the various assembly members of assembly train 148. Although the present invention is described with reference to manually loading parts nest 164 with assembly components, it should be understood that the assembly of components into parts nest 164 may be automated. Alternative methods of loading assembly components relative to the assembly members is contemplated and the invention is not limited to the exact embodiment shown.

Once the assembly components are loaded in parts nest 164, assembly train 148 is aligned relative to parts nest 164 via slide 154 and is lowered via lift 166 so that individual assembly members engage respective assembly components for assembly, as will be explained. After assembly members 140, 142, 146 engage the assembly components (e.g., filter housing 110, latch assembly, and magnet-and-backiron assembly 120), assembly train 148 is raised via lift 166, and assembly train 148 is moved along track 152 to an assembly position aligned with the disc drive, as shown in FIG. 3-2. Assembly train 148 is designed to move along track 152 in a raised position so that assembly components are supported above nest 164 and the disc drive supported via plate 184. In the assembly position, assembly train 148 is lowered via lift 166 to align with a disc drive for installation.

Figure 4:
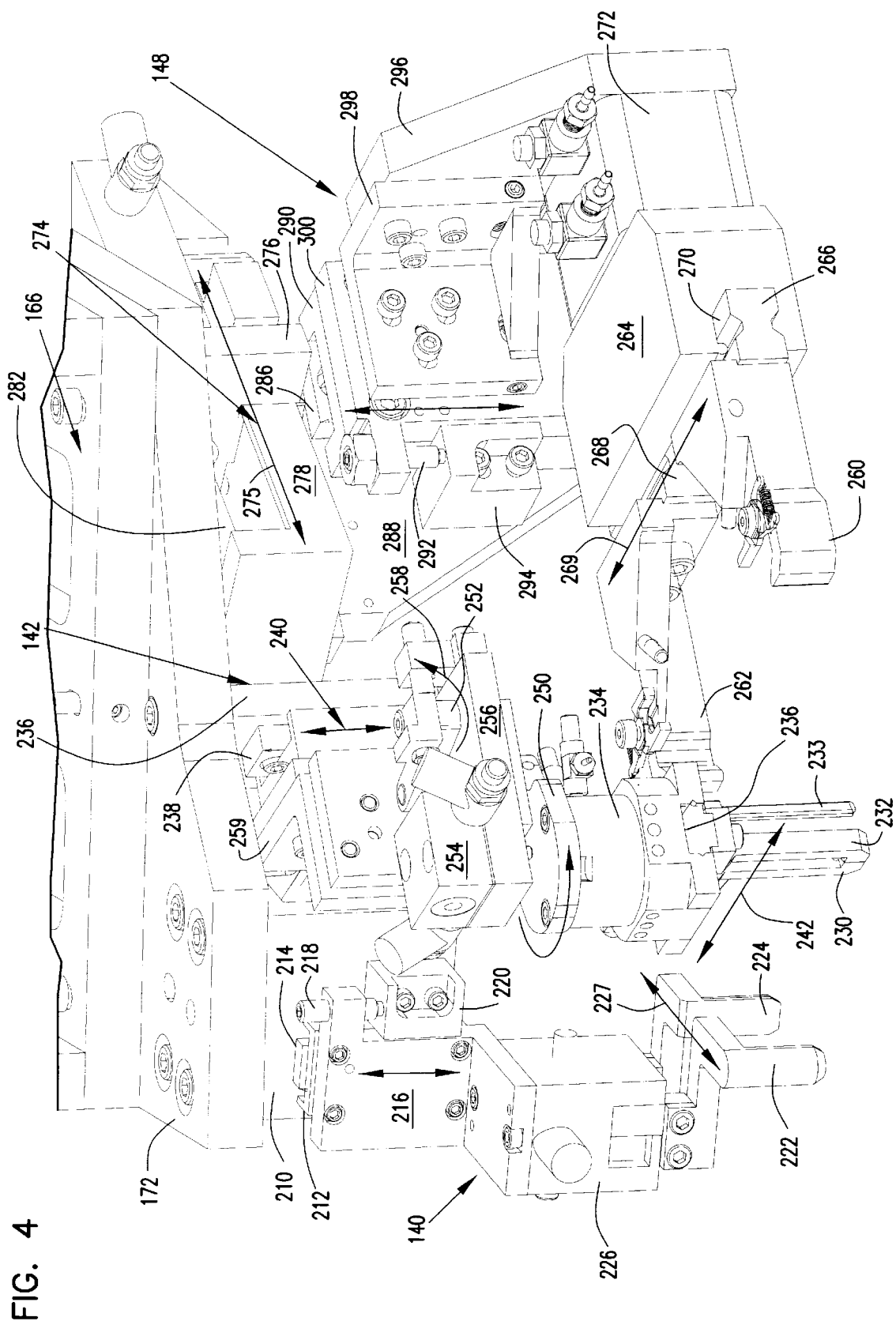
FIG. 4 is a detailed perspective view of assembly members of the embodiment of the assembly device illustrated in FIG. 1.

FIG. 4 is a detailed illustration of the individual assembly members of assembly train 148. As shown in FIG. 4, filter housing assembly member 140 includes a mounting block 210, a slide 212, a track 214, a bracket 216, a stop pin 218, a stop block 220, fingers 222 and 224, and a finger actuator block 226. Mounting block 210 is coupled to mounting plate 172 and is movable via operation of lift 166 between a raised position and a lowered operation position, as illustrated in FIGS. 3-1, 3-2, for gripping a filter and assembling a filter into a disc drive. Fingers 222, 224 are movably supported relative to block 226, as illustrated by arrow 227, to operate between a gripping position and an insertion position. In the insertion position, fingers 222, 224 are retracted for loading or inserting into filter housing 110; and, in the gripping position, fingers 222, 224 are expanded to engage the filter for assembly, as will be explained. Block 226 movably supports fingers 222, 224 and is movably coupled to mounting plate 172 and is supported thereby for movement by slide 154 and lift 166 along the -x- and -z- axes. Assembly member 140 includes a photosensor (not shown in FIG. 4) for detecting obstructions which would interfere with operation.

A pneumatic device operates fingers 222, 224 between the insertion position and the gripping position. Fingers 222, 224 are slidably coupled to lift 166 via cooperation of slide 212 and track 214 so that fingers 222, 224 and assembly member 140 are compliantly coupled to lift 166 to allow assembly member 140 to move relative to lift 166 if obstructed during systematic operation of lift 166. Mounting bracket 216 includes stop pin 218, which aligns with stop block 220, which is coupled to mounting block 210, for defining an elevation position for block 226 and fingers 222, 224, supported thereby.

Latch assembly member 142 is designed to assemble a latch assembly for controlling the position of actuator block 118. Latch base assembly member 142 includes gripping fingers 230, 232; a guide 233; and a latch pivot assembly for installing the latch assembly as will be described. Fingers 230, 232 and guide 233 are supported via finger actuator 234. The finger actuator 234 is compliantly coupled to mounting plate 172 and lift 166 for operation. In particular, as shown, bracket 236 is coupled to mounting plate 172 to support track 238. Slide 240 is movable along track 238 to compliantly support finger actuator (gripper) 234 and fingers 230, 232, similar to block 226, supporting fingers 222, 224 of the filter housing assembly member 140 in case of obstruction. Finger actuator 234 is supported in an elevation position via cooperation of a stop block and a stop pin (not shown in FIG. 4), similar to that described for assembly member 140.

Fingers 230, 232 are movably coupled along a track 236 to operate between an engaged position and a disengaged position, as illustrated by arrow 242. Fingers 230, 232 are actuated between the engaged position and the non-engaged position via operation of finger actuator 234, which is operated pneumatically. The pivot assembly moves latch assembly 324 between an install position and a locked position, and includes pivot plate 250 and a pivot arm 252, which is actuated via a pneumatic actuator 254, supported via platform 256. Pivot arm 252 is rotated as illustrated by arrow 258 to rotate plate 250 therewith. Finger actuator 246 is coupled to pivot plate 250 and is rotated thereby to move gripping fingers between an install position and a locked position, as will be explained. An "L"-shaped bracket 259 supports finger actuator 246 and the pivot assembly relative to slide 240.

Magnet-and-backiron assembly member 148 assembles magnet-and-backiron assembly 120 relative to a coil bobbin, coupled to the actuator block to assemble the voice coil motor. The magnet-and-backiron assembly member includes opposed gripper arms 260, 262. Gripper arms 260, 262 are slidably coupled to a gripper arm block 264 via extensions 266, 268 to operate between an engaged gripping position and a disengaged position as, illustrated by arrow 269. Slide extensions 266, 268 move along a track 270, formed on gripper arm block 264 via pneumatic actuator device 272, coupled to controller 149. Gripper arms 260, 262 are movably supported relative to lift 166 via an insertion slide assembly 274, which selectively positions gripper arms 260, 262 between a retracted position and an insertion position, as will be explained and as illustrated by arrow 275. Slide assembly 274 includes a base 276, a slide 278, and actuator rods 282, 284 (not shown in FIG. 4). Insertion slide 278 moves between a retracted position and an insertion position via operation of a pneumatic actuator, which actuates rods 282, 284 coupled to insertion slide 278 to move slide 278 between the retracted position and the insertion position. Base 276 is rigidly coupled to lift 166 via mounting plate 172 for movement thereby to raise and lower gripper arms 260, 262 for operation.

Gripper arms 260, 262 are compliantly coupled to slide assembly 274, which is rigidly coupled to lift 166 to allow gripper arms 260, 262 to move independently of lift 166 if an obstruction is encountered. Gripper arms 260, 262 are compliantly coupled via cooperation of a track 286, coupled to slide assembly 274 via a bracket 288 and a slide 290, operably coupled to gripper arms 260, 262. Operation of slide 290 along track 286 is controlled via cooperation of a stop pin 292 contacting stop block 294, similar to that previously described for assembly members 140, 142. In particular, gripper arm block 264 is operably coupled to slide 286 via cooperation of a plate 296, a bracket 298, and a plate 300 to compliantly couple gripper arms 260, 262 relative to slide 278. Plate 300 supports stop pin 292 for alignment with stop block 294, coupled to bracket 288 to limit motion of slide 290 for defining the elevational position of gripper arms 260, 262.

The components of assembly train 148 are used to assemble various components of the disc drive. In particular, filter assembly member 140 is used to assemble a filter housing 110, as illustrated in FIGS. 5-1 and 5-2. As shown in FIG. 5-1, filter housing 110 includes base 300. Base 300 is essentially triangular in shape and includes a plurality of posts 304, 306, 308, 310 extending therefrom. Posts 304, 306 include rounded channels 312 (channel 312 of post 306 visible in FIG. 1). Posts 306, 308 include filter channels 316. Cooperating filter channels 316 are aligned to support a filter (not shown). Opposed channels 312 form channels for assembly.

Fingers 222, 224 of assembly member 140 are sized to fit into channels 312 to grip the filter housing 110 for assembly thereby. In particular, when the filter assembly member 140 is lowered via operation of lift 166 to align with nest 164, fingers 222, 224 are supported in a retracted position for insertion into channels 312 of posts 304, 306. Fingers 222, 224 are opened to the gripping position to engage posts 304, 306 to grip filter housing 110 for assembly. Filter housing 110 includes screw holes 320, 322 for connection to a chassis of a disc drive. Although a particular filter housing is illustrated for assembly, the invention is not limited to the specific filter housing shown.

Figure 6:
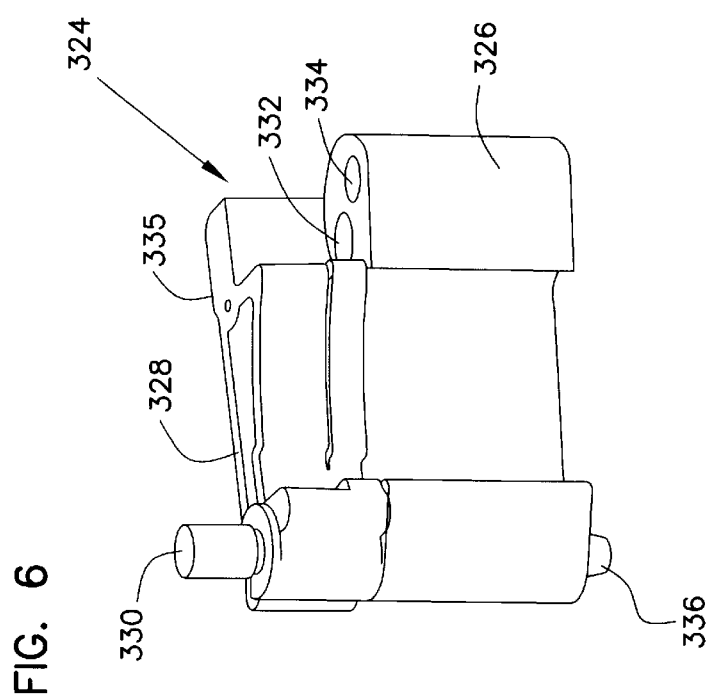
FIG. 6 is a perspective view of an embodiment of a latch base assembled via an assembly member of the embodiment of the assembly device illustrated in FIG. 1.

As previously explained, latch assembly member 142 is used to assemble a latch assembly 324, as shown in FIG. 6, for controlling the position of actuator block 118. As previously explained, actuator block 118 is actuated via a voice coil motor, including a voice coil bobbin (not shown) coupled to the actuator block and operable within a magnetic field defined by a magnet-and-backiron assembly. While the disc drive is not in operation, it is desirable that heads coupled to actuator block 118 rest on landing zone 136 of the disc 106. To ensure proper placement of heads 126 in the nonoperational position, actuator block 118 supports a magnetic stop pin (not shown) that cooperates with latch assembly 324, rigidly supported relative to base 104 of the disc drive.

An embodiment of latch assembly 324 is illustrated in FIG. 6 for cooperating with a stop pin (not shown) coupled to actuator block 118. As shown, latch assembly 324 includes a latch assembly 326 and a lever latch 328. Lever latch 328 is rotationally coupled to base 326 via a pin 330. As shown, base 326 includes a pin hole 332, which couples to a pin (not shown) on base 104; and a hole 334 for receiving a fastener (not shown) for securing latch assembly 324 to the disc drive for operation. Lever latch 328 includes a magnet 335 which operates with stop pin (not shown) to control the nonoperational position of the actuator block 118. Although a particular latch assembly is shown, the invention is not limited to the particular latch assembly shown.

As previously explained, latch assembly 324 is assembled via latch assembly member 142. In particular, gripper fingers 230, 232 are aligned to engage pin 330 in the engaged position; and guide 233 is aligned to arm 328 to maintain the position of the components of latch assembly 324 so that they do not move relative to one another during assembly. Latch assembly member 142 moves between a raised position and a lowered position via operation of lift 166 for assembly. Latch assembly member 142 is lowered by lift 166 so that fingers 230, 232 grip pin 330, and so that guide 233 contacts base 326 and latch 328 when latch assembly member 142 is aligned with parts nest 164.

After engaging latch assembly 324 with fingers 230, 232, member 142 is raised via lift 166 and moved to the assembly position aligned with a disc drive for assembly. Thereafter, latch assembly member 142 is lowered via lift 166 to insert a pin (not shown) extending from base 104 through pin hole 332. Once pin 330 extends through pin hole 332, the pivot assembly operates to rotate fingers 230, 232 and pin 330 (of latch assembly 324) from the install position to the locked position for alignment relative to actuator block 118 for operation. Rotation of the pivot assembly positions latch assembly 324 so that end pin 336 is aligned with a receiving hole on base 104 of the disc drive, and a fastener extends through hole 334 to secure latch assembly 324 to the base 104 of the disc drive.

Figure 7:
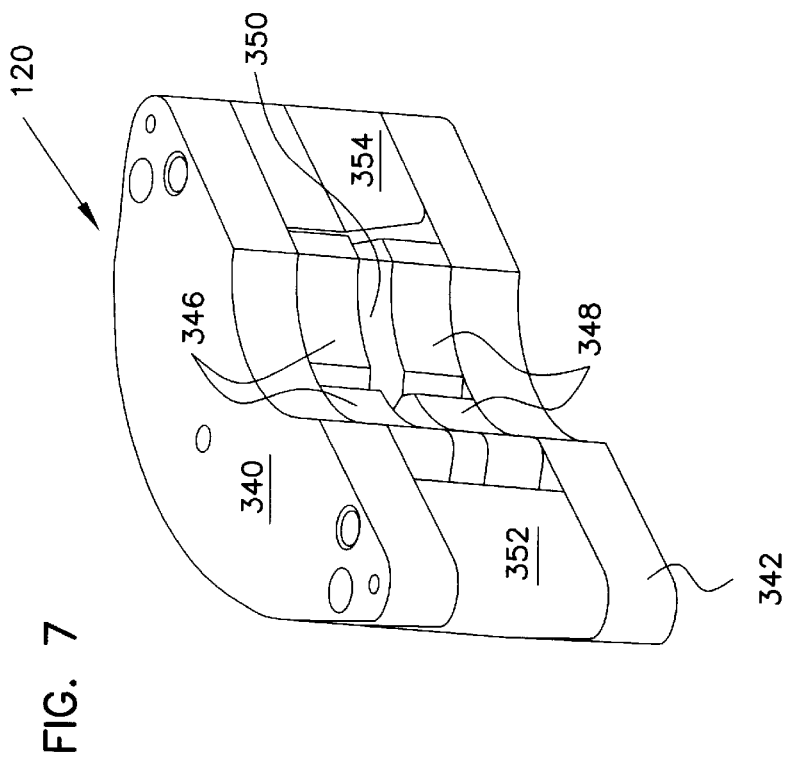
FIG. 7 is a perspective view of an embodiment of a magnet-and-backiron assembly assembled via an assembly member of the embodiment of the assembly device illustrated in FIG. 1.

The magnet-and-backiron assembly 120 is assembled via magnet-and-backiron assembly member 146. As shown in FIG. 7, magnet-and-backiron assembly 120 includes spaced backirons 340, 342, supporting magnets 346, 348 in spaced parallel relation to define an air gap 350 therebetween. Backirons 342, 344 are supported in spaced parallel relation via rods 352, 354. Although a particular magnet-and-backiron assembly is illustrated, it should be understood that the invention is not limited to installation of the particular magnet-and-backiron assembly shown.

Figure 8:
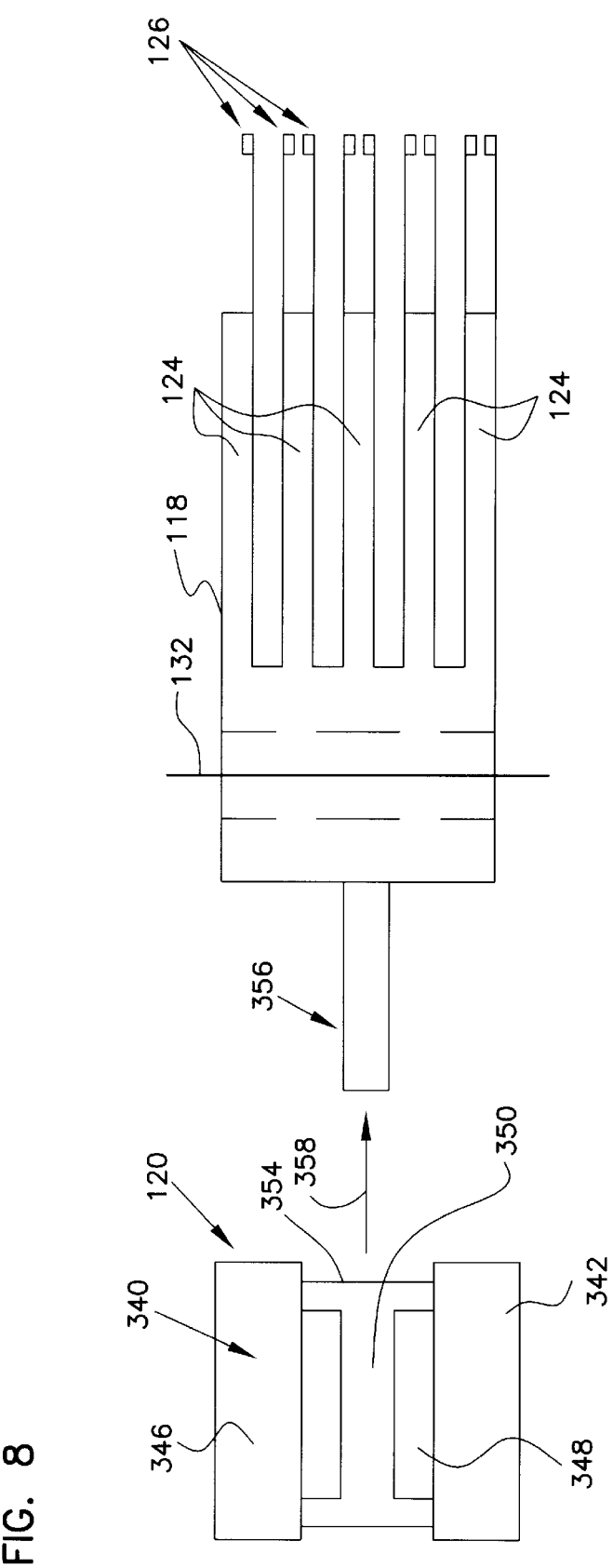
FIG. 8 is an illustrative view illustrating insertion of a magnet-and-backiron assembly, relative to a coil bobbin of an actuator, for constructing a voice coil motor for operating the actuator for head placement.

Magnet-and-backiron assembly 120 is installed as illustrated in FIG. 8 so that a coil bobbin 356 coupled to the actuator block 118 and extending therefrom extends into gap 350 to operate in the magnet field created via permanent magnets 346, 348 to form the voice coil motor. Thus, to install magnet-and-backiron assembly 120 relative to the coil bobbin 356, it is necessary to position the magnet-and-backiron assembly via operation of lift 166 to align gap 350 relative to the coil bobbin 356, as illustrated in FIG. 8.

After the magnet-and-backiron assembly 120 is aligned relative to coil bobbin 356, magnet-and-backiron assembly 120 is inserted as illustrated by arrow 358 along an -xy-plane to insert the coil bobbin 356 in air gap 350 between permanent magnets 346, 348. The magnet-and-backiron assembly member 146 is lowered via operation of lift 166 to lower the magnet-and-backiron 120, secured via gripper arms 260, 262, to align with the coil bobbin 386. Thereafter, gripper arms 260, 262 are slid forward via operation of slide assembly 374, as illustrated by arrow 358, to advance the magnet-and-backiron assembly 120 toward coil bobbin 356 so that coil bobbin 356 is positioned in air gap 350.

Figure 9:
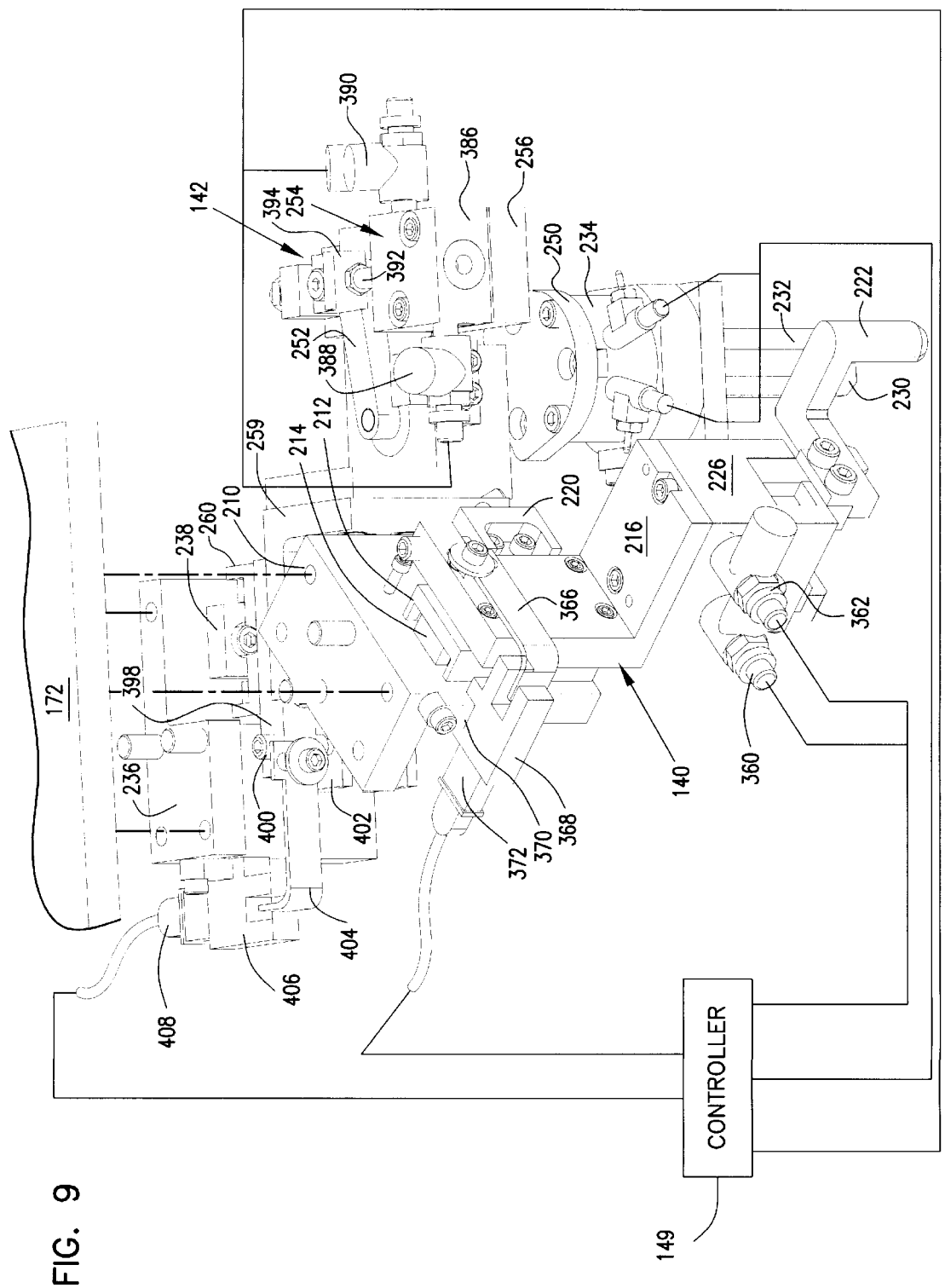
FIG. 9 is a perspective view of an embodiment of a filter housing assembly member and latch base assembly member of the embodiment of the assembly device illustrated in FIG. 1.
Figure 10:
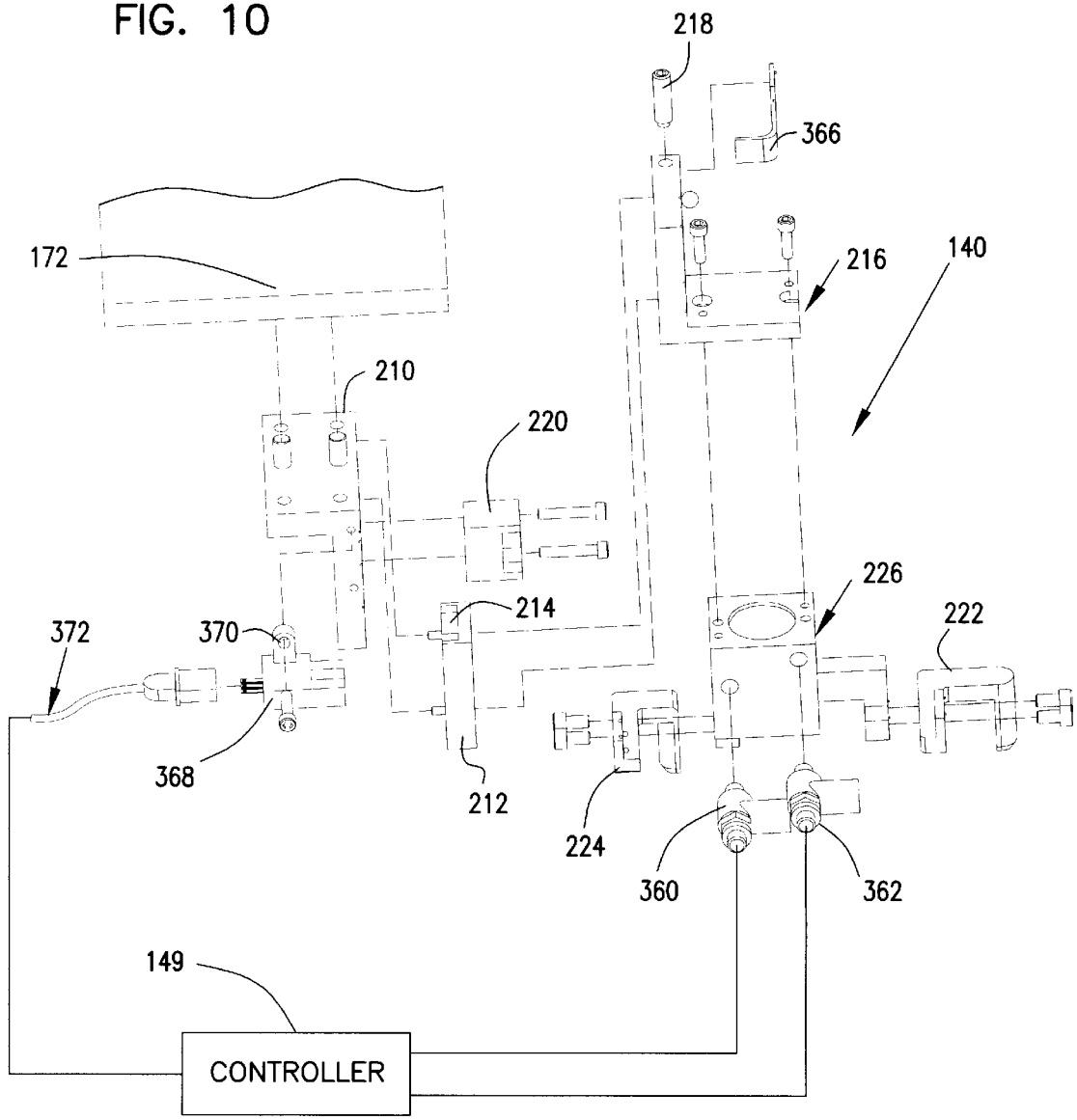
FIG. 10 is an exploded view of the embodiment of the filter housing assembly member illustrated in FIG. 9.

FIG. 9 is a perspective view of the filter housing assembly member 140 and latch assembly member 142. FIG. 10 is an exploded view of filter assembly member 140. As shown in the embodiment of filter housing assembly member 140 illustrated in FIGS. 9–10, stop block 220 is mounted on block 210, which is coupled to mounting plate 172. Stop pin 218 extends through bracket 216 in alignment with stop block 220 to support gripper fingers 222, 224 at a standard elevation position relative to lift block 166. Block 226 supports fingers 222, 224 for operation between the gripping position and the insertion position, as previously explained. Control valves 360, 362 provide actuation pressure for moving fingers 222, 224. A trigger lever 366 is coupled to bracket 216 to detect obstructions via movement of bracket 216. A photosensor 368 is coupled to trigger lever 366 to detect obstructions via movement of trigger lever 366, and is supported via mounting block 210 via bracket 370. Photosensor 368 is coupled to controller 149 via connector 372 for controlling operation of lift 166 when there is an obstruction.

Figure 11:
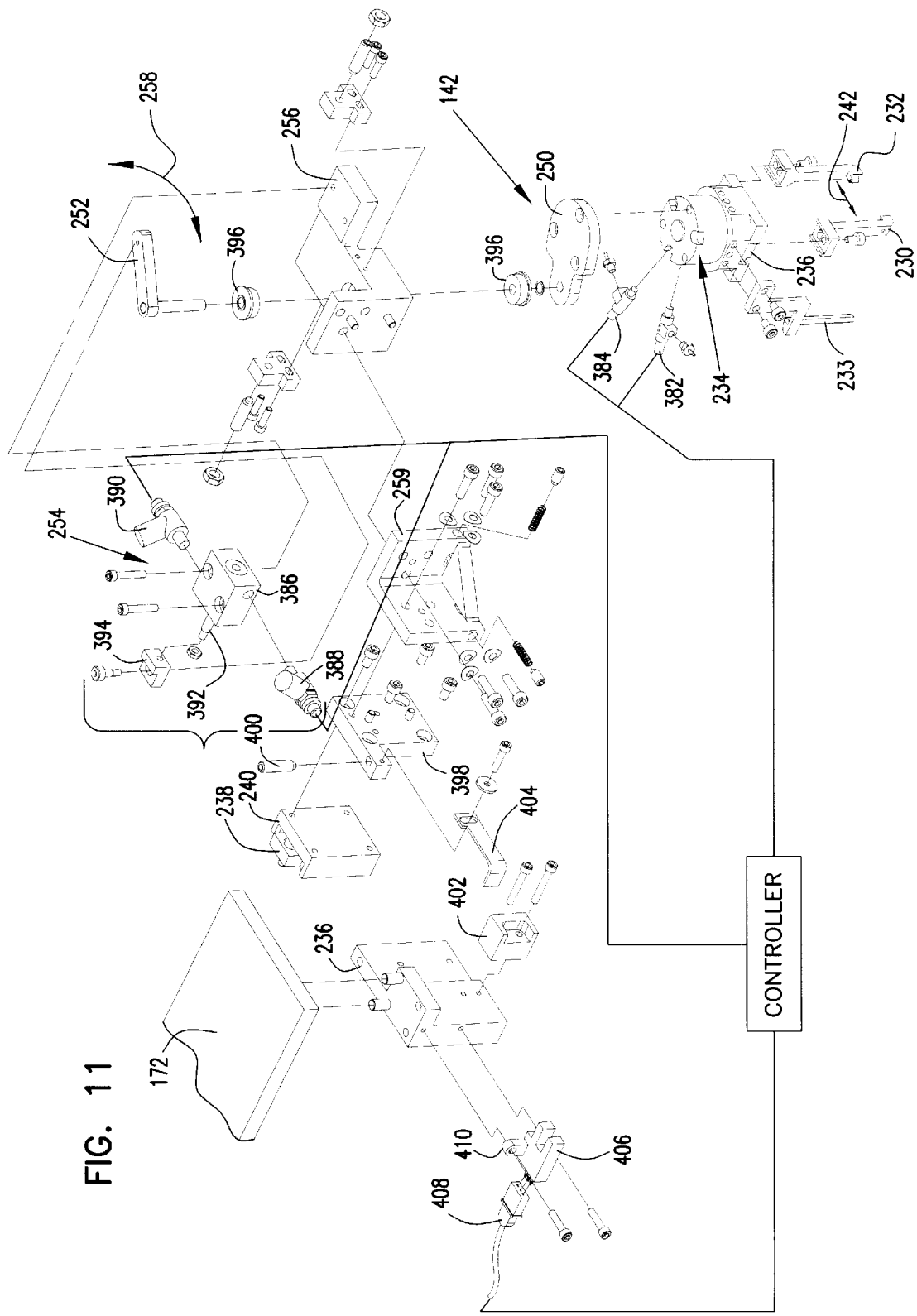
FIG. 11 is an exploded view of the embodiment of the latch base assembly member illustrated in FIG. 9.

FIG. 9 also illustrates the latch base assembly member, and FIG. 11 is an exploded view of latch assembly member 142. As illustrated, finger actuator 246 is a pneumatic device including flow control valves 382, 384 for moving fingers 230, 232 between an engaged position and a disengaged position for gripping latch assembly 324. Pivot actuator 254 includes an actuator block 386; control valves 388, 390; a rod 392; and a connector block 394 for moving pivot arm 252 for operating fingers 230, 232 between an install position and a locked position. Control valves 388, 390 control pneumatic pressure for moving rod 392 for actuating pivot arm 252 coupled thereto for rotating plate 250 supporting gripper fingers 230, 232 via base 234 to move gripper fingers 230, 232 between the install position and the locked position.

As shown, pivot arm 252 is rotationally coupled to platform 256 via bearings 396 and is rigidly coupled to pivot plate 250 to rotate pivot plate 250. Platform 256 is coupled to slide 240 via bracket 259 and plate 398. Plate 398 supports stop pin 400 in alignment with stop block 402 supported via bracket 236 to define the elevational position of the gripper fingers 230, 232. Plate 398 also supports trigger lever 404 to detect obstructions in cooperation with photosensor 406, coupled to controller 149 via connector 408, as previously explained for assembly member 140. Photosensor 406 is rigidly supported via bracket 236 by a fastener (not shown) extending through bracket 410 to detect movement of trigger lever 404, supported relative to slide 240 via plate 398.

Figure 12:
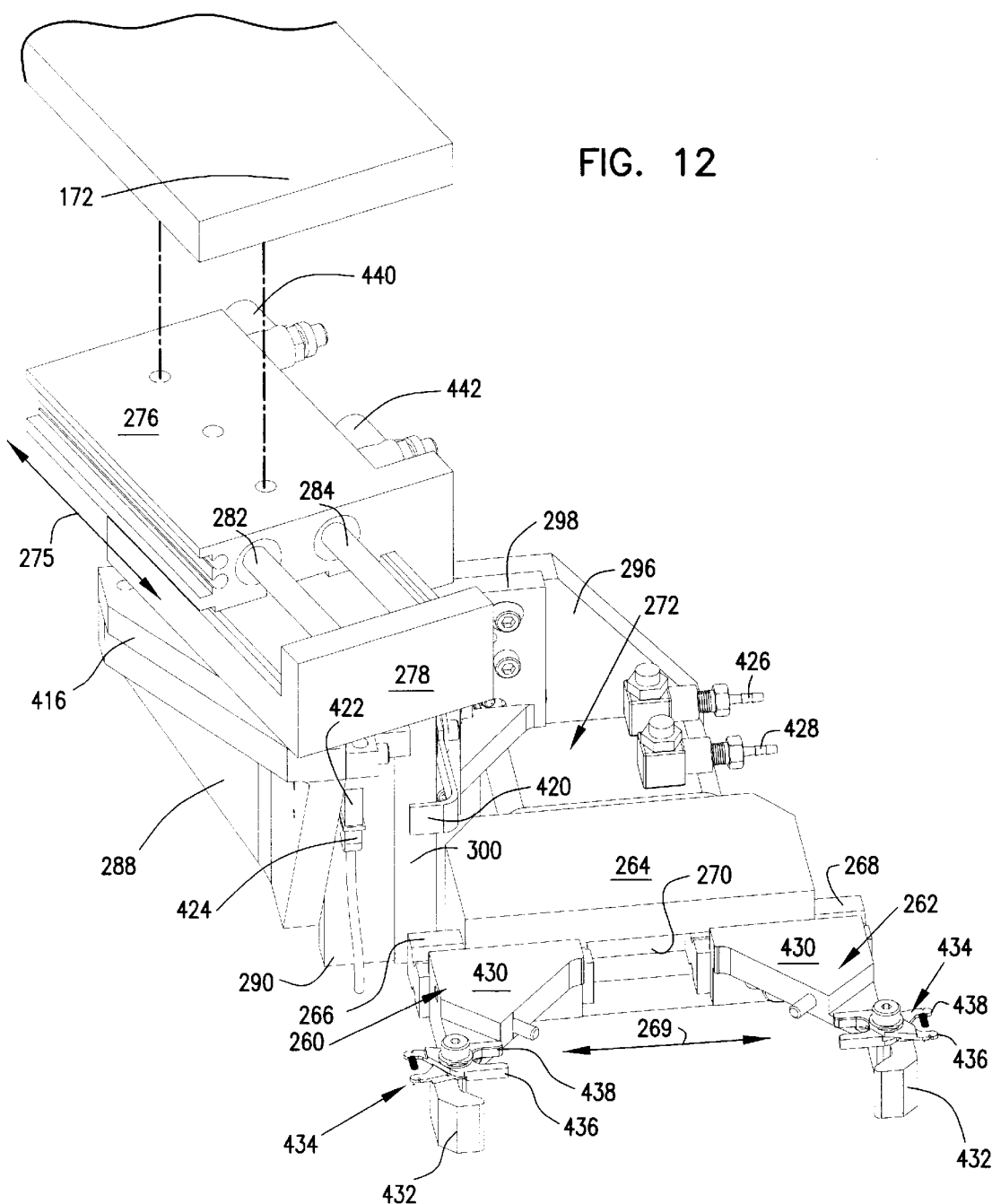
FIG. 12 is a perspective view of an embodiment of a magnet-and-backiron assembly member of the embodiment of the assembly device illustrated in FIG. 1.
Figure 13:
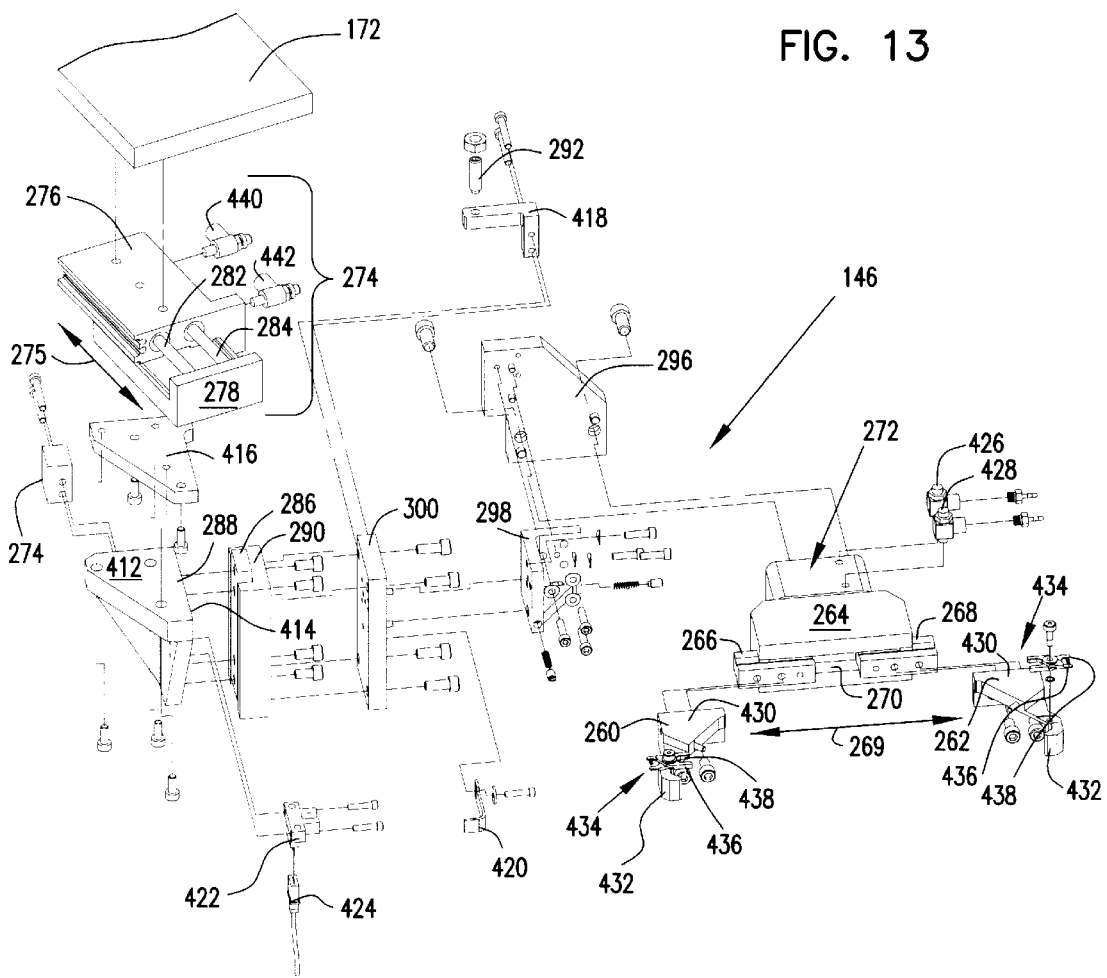
FIG. 13 is an exploded view of the magnet-and-backiron assembly member illustrated in FIG. 12.

FIG. 12 is a detailed perspective view and FIG. 13 is an exploded view illustrating the components of magnet-and-backiron assembly member 146. As shown, base 276 of insertion slide assembly 274 is coupled to mounting plate 172 to couple to lift 166 for movement of the assembly member 146 thereby. Bracket 288 includes perpendicularly-aligned mounting surfaces 412, 414 (shown in FIG. 13). Slide 278 is coupled to mounting surface 412 via plate 416. Track 286 is coupled to mounting surface 414. As shown, gripper arms 260, 262 are coupled to slide 290 so that gripper arms 260, 262 are compliantly supported relative to lift 166 to compensate for obstructions, and are coupled to slide 278 to slidably support gripper arms 260, 262 between a retracted position and an insertion position for assembly of magnet-and-backiron assembly 120 as previously explained. As shown, stop pin 292 is supported by an "L"-shaped bracket 418 coupled to plate 300. Stop pin 292 aligns with stop block 294 to define a standard elevation position for gripper arms 260, 262, similar to assembly member 140, 142. Magnet-and-backiron assembly member 146 includes trigger lever 420, supported by plate 300 and movable therewith in alignment with photosensor 422, to detect obstructions, as previously explained in relation to assemblies 140, 142. The photosensor is coupled to controller 149 via a connector 424 to cease operation of lift 166 if an obstruction is detected.

As previously explained, gripper arms 260, 262 move as illustrated by arrow 269 between a disengaged position and an engaged gripping position, when lift 166 is lowered relative to nest 162 and assembly member 148 is aligned with nest 162 to grip the magnet-and-backiron assembly for assembly. In particular, extensions 266, 268 are coupled to gripper arms 260, 262 and move along track 270 via pressure supplied to control valves 426, 428 to operate actuator 272. Gripper arms 260, 262 have a base 430 and include curved hands 432 for gripping the backiron of the magnet-and-backiron assembly. Spring latches 434 are coupled to base 432 and include normally-biased spring arms 436, 438, adapted to engage fastener members of magnet-and-backiron assembly 120 for gripping the magnet-and-backiron assembly for assembly.

After the magnet-and-backiron assembly 120 is gripped, the assembly is lifted via operation of lift 166 to move the magnet-and-backiron assembly member 146 from parts nest 164 to align with a disc drive at a disc drive station. Once magnet-and-backiron assembly member 146 is located relative to the disc drive, the assembly is lowered via operation of lift 166. The magnet-and-backiron assembly is lowered as previously illustrated in FIG. 8 until air gap 350 of magnet-and-backiron assembly 120 is aligned relative to coil bobbin 356. Thereafter, slide 278 moves the gripper arms 260, 262 to advance magnet-and-backiron assembly 120 to align with coil bobbin 356 so that coil bobbin 356 of actuator block 118 is located in air gap 350. The gripper arms are advanced via operation of insertion slide assembly 274, which operates slide 278 between a retracted position and an insertion position via extension and retraction of rods 282, 284 preferably via a pneumatic actuator. Control valves 440, 442 actuate rods 282, 284 for operation of slide 278 for aligning the magnet-and-backiron assembly 120 relative to coil bobbin 356.

Figure 14:
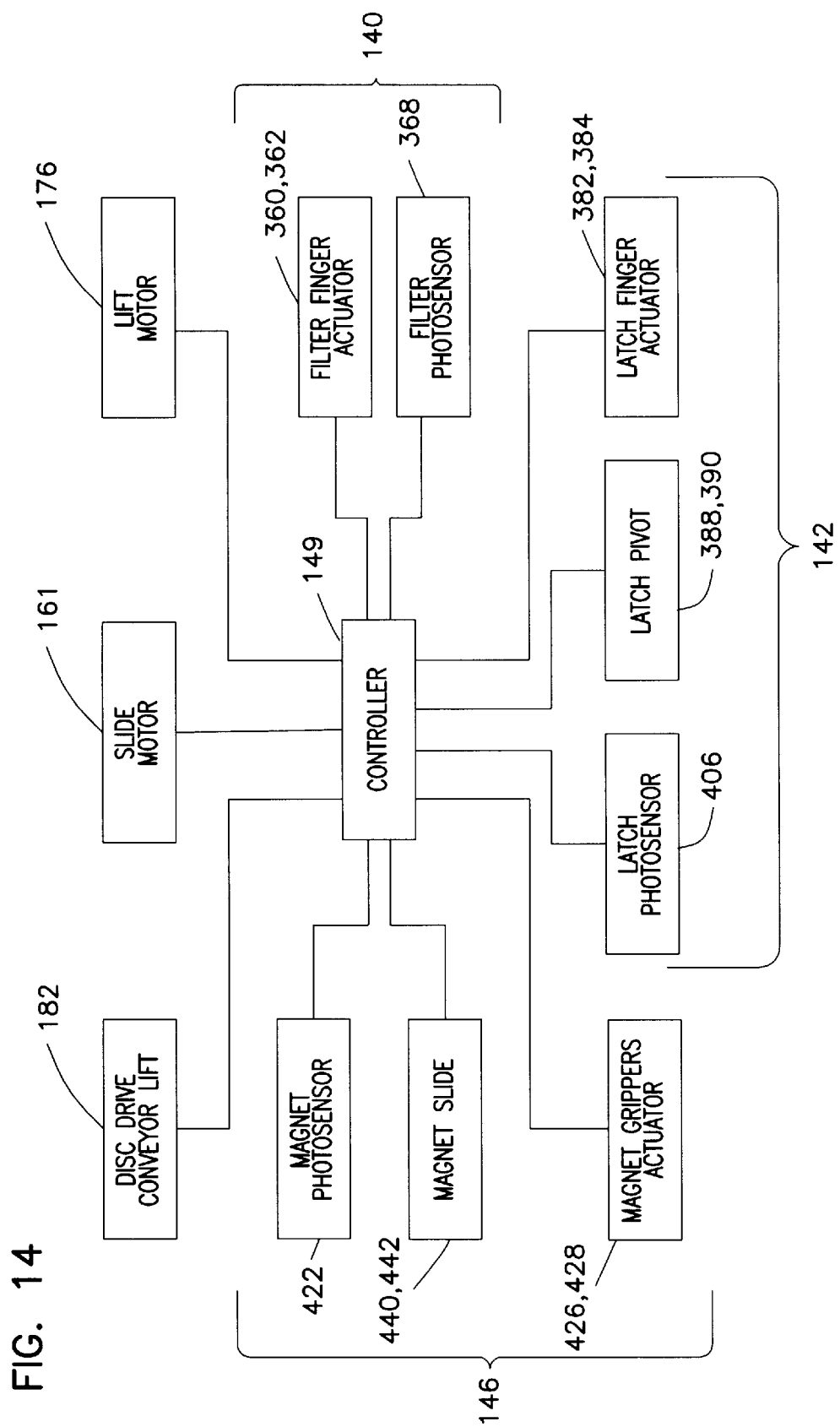
FIG. 14 is a block diagram illustrating operation via a controller of components of the embodiment of the assembly device illustrated in FIG. 1.

Operation of assembly device 100 is controlled via controller 149, as illustrated in FIG. 14. Controller 149 is coupled to slide motor 176 and lift motor 161 for selectively moving assembly train 148 (and assembly members 140, 142, and 146 therewith) between parts nest 164 and the disc drive station via slide 154, and for selectively raising and lowering assembly train 148 (and assembly members 140, 142, and 146) via lift 166 for loading and unloading parts for assembly or installation into a disc drive. Disc drive lift assembly 182 is coupled to controller 149 for coordinated operation to lift a disc drive from conveyor 178 for assembly. As shown, controller 149 also controls operation of individual assembly members 140, 142, 146 of assembly train 140. In particular, controller 149 controls filter fingers 222, 224 to operate fingers 222, 224 between the insertion position and the gripping position to engage and disengage filter housing 110 via valves 360, 362; fingers 230, 232 to engage and disengage latch assembly 324 via valves 382, 384; valves 388, 390 to operate pivot plate 250 between the install and lock positions for assembly of latch assembly 324; and actuator valves 426, 428 for operating gripper arms 260, 262 to engage and disengage the magnet-and-backiron assembly; and valves 440, 442 for slide 278 for assembly of the magnet-and-backiron assembly 120. Photosensors 368, 406, 422; coupled to assembly members 140, 142, 146; are coupled to controller 149 for controlling operation of device 100 when there is an obstruction affecting operation.

Figures 1, 15:
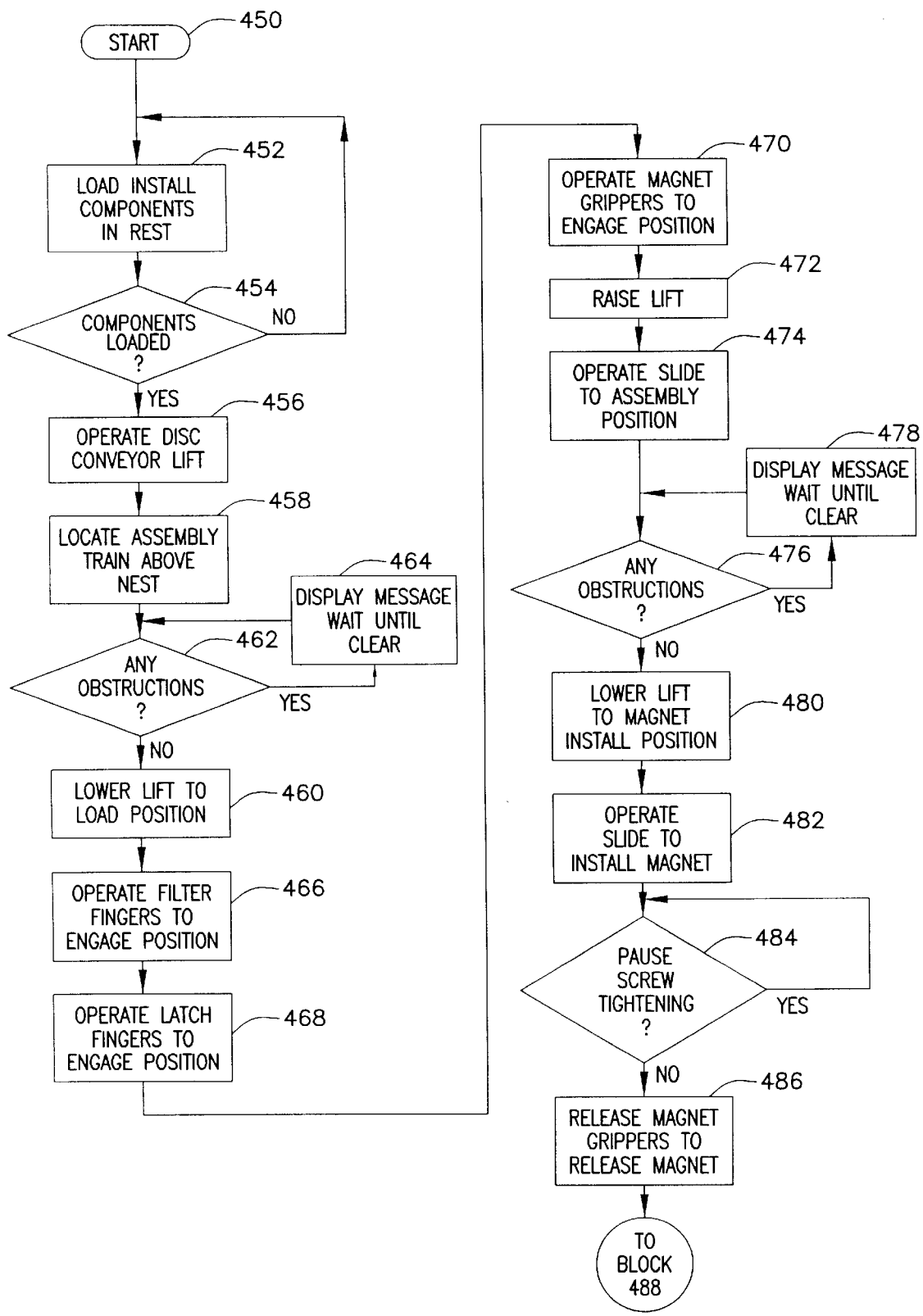
Figures 2, 15:
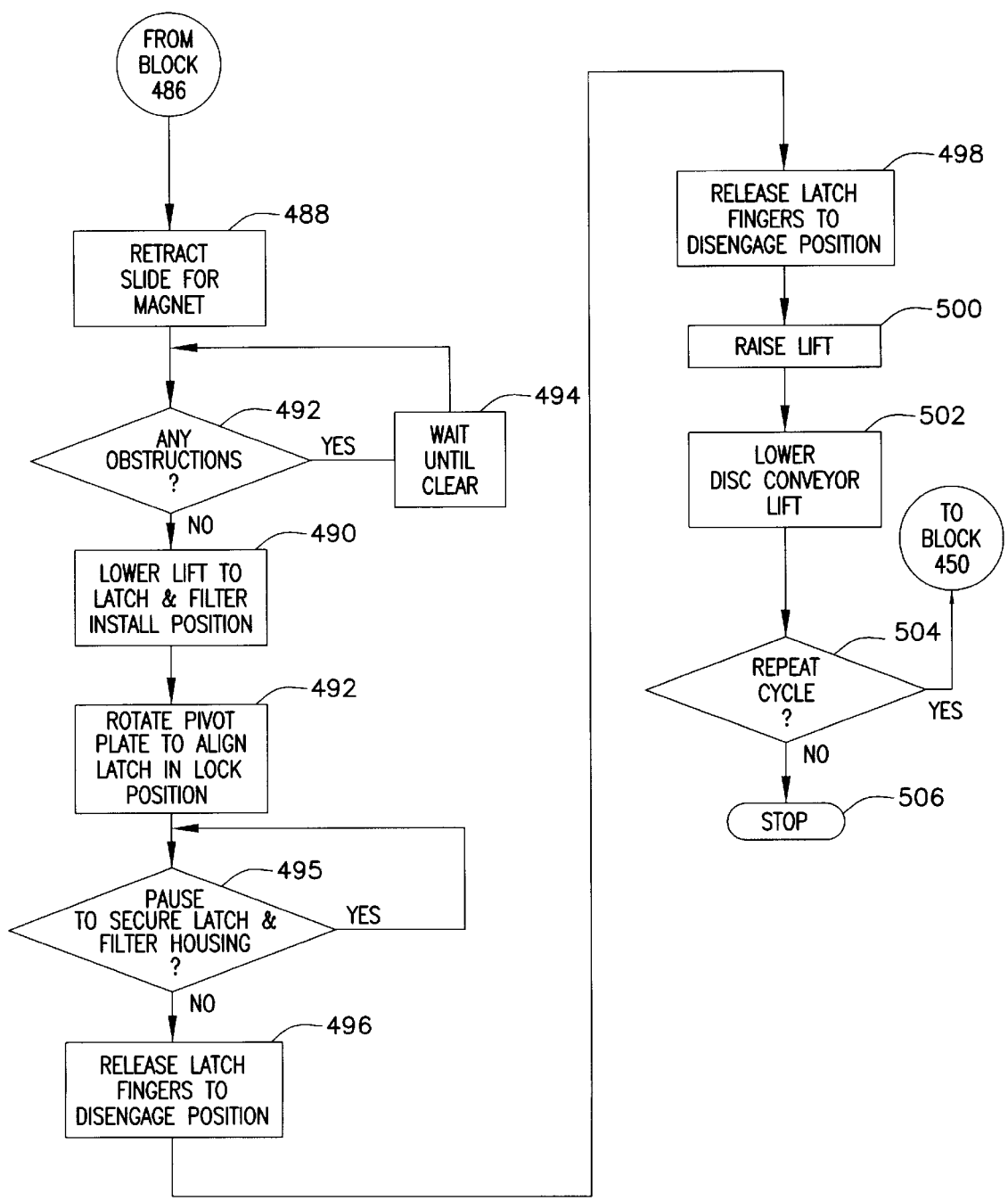

FIG. 15 is a flow block diagram illustrating an install operation cycle of assembly device 100. Operation commences as illustrated by block 450; and the assembly device prompts the user to load install components into nest 164, as illustrated, via block 452. Operation of device 100 pauses until assembly components are loaded as illustrated by block 454. Once the install or assembly components are loaded into nest 164, disc drive lift assembly 182 (illustrated in FIGS. 3-1 and 3-2) operates to lift the disc drive from conveyor 178 to an assembly position aligned with assembly base 158, as illustrated by block 456. Preferably, operation of the disc drive lift assembly is controlled via an operator who pushes a start button to commence installation after the install components (filter housing 110, latch assembly 324, and magnet-and-backiron assembly 120) are loaded into nest 164. Thus, operation waits until the install components are loaded in nest 164 as illustrated by block 454. However, other methods for synchronizing operation of the disc drive lift assembly after the install components have been loaded may be used, and the invention is not limited to any particular system.

To load and install components 110, 120, and 324, slide 154 moves assembly train 148 to align the assembly train relative to nest 164, as illustrated by block 458. Once assembly train 148 is located relative to the nest 164, lift 166.lowers assembly train 148 to align with nest 164 for loading the install components as illustrated by block 460. Lift 166 operates to lower train 148, as long as there are no obstructions between the assembly members on the assembly train and the nest components, as illustrated by blocks 462 and 464.

Lift 166 lowers assembly train 148 to a load position so that fingers 222, 224 extend into finger channels 312. Latch fingers 230, 232 are aligned with pin 330; and grippers 260, 262 align with magnet-and-backiron assembly 120. Thereafter, an actuator moves filter fingers 222, 224 to grip filter housing 310 as illustrated by block 466. An actuator moves latch fingers 230, 232 to the engaged position to grip pin 330 of latch assembly 324, as illustrated by block 468. Additionally, an actuator operates magnet gripper arms 260, 262 to engage magnet-and-backiron assembly 120 as illustrated by block 470.

Once the install components are loaded to assembly members 140, 142, 146 of assembly train 148, lift 166 is raised to raise the assembly train out of alignment with nest 164 and the disc drive supported via disc drive lift assembly 182, as illustrated by block 472. Thereafter, slide 154 moves assembly train 148 to an assembly position aligned with the disc drive, as illustrated by block 474. Thereafter, lift 166 lowers assembly train 148 to an install position relative to the disc drive. Lift 166 is lowered as illustrated by blocks 476, 478, as long as there are no obstructions.

Lift 166 is lowered to a magnet install position, as illustrated by block 480, to align gap 350 with bobbin 356. Thereafter, insertion slide 278 moves to insert the magnet-and-backiron assembly until the coil bobbin 356 is located in gap 350, as illustrated by block 482. Thereafter, operation ceases so that the magnet screws may be tightened as illustrated by block 484. Preferably, when operation ceases, a signal is sent to the installer to tighten the magnet screws before continuing operation. Once the magnet screws are tightened, grippers 260, 262 release the magnet to unload the magnet for installation via operation of actuator 272, as illustrated by block 486. Thereafter, insertion slide 278 is moved to a retracted position, out of alignment with the installed magnet-and-backiron assembly 120 as illustrated by block 488, for continued operation of lift 166 to lower assembly train 142 without obstruction.

Lift 166 is continually lowered to install filter housing 110 and latch assembly 324, as illustrated by block 490. Lift 166 is lowered to install filter housing 110 and latch assembly 324, as long as there are no obstructions, as illustrated by block 492, 494. As lift 166 lowers latch assembly 324, a pin extending from base 104 of disc drive 102 extends through channel 332 on latch assembly 324. Thereafter, pivot actuator 254 operates pivot plate 250 to rotate latch fingers 230, 232 from an install position to a locked position, as illustrated via block 492, to position latch assembly 324 in a locked assembled position relative to the actuator block 118.

Thereafter, the system pauses so that filter housing 110 and latch assembly 324 may be fastened relative to base 104 of the disc drive, as illustrated by block 494. After filter housing 110 and latch assembly 324 are fastened, latch fingers 230, 232 and filter fingers 222, 224 are moved to a disengaged position as illustrated by blocks 496, 498 to release or unload latch assembly 324 and filter housing 110. After assembly, lift 166 is raised to an elevated nonoperational position as illustrated by block 500, and disc conveyor lift 182 lowers the completed disc drive back to conveyor 178 as illustrated by block 502. The operation cycle is repeated for each disc drive desired, as illustrated by block 504, and operation ends as illustrated by block 506.

Although a specific sequence of operation is illustrated in FIGS. 5-1 and 5-2, application of the present invention is not limited to the specific sequence shown. Thus, an embodiment of the present invention is illustrated.

As shown, the present invention discloses an assembly device 100 disclosed includes an assembly train 148 for collectively assembling a plurality of components of a disc drive in a single operation cycle. The assembly train 148 operates between a load position and an install position for transportation and installation of the assembly components. The assembly train 148 includes a plurality of assembly members including engaging members (for example, filter fingers 222, 224; latch base fingers 230, 232 and magnet gripper arms 260, 262) for loading components for transport to a disc drive station. Operation of the device is controlled via a controller 149. Although a preferred embodiment of the present invention illustrates an assembly train including a filter housing assembly member; a latch base assembly member and a magnet-and-backiron assembly member, the invention is limited only as to the claims and is not limited to the specific embodiment shown, as alternate embodiments of the invention are contemplated which include additional or alternate members for assembling various components of a disc drive.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic disc drive system, it will be appreciated by those skilled in the art that the teachings of the present invention can be applied to other systems, for example optical data storage systems, without departing from the scope and spirit of the present invention.

What is claimed is:

1. An assembly device for assembling components of a disc drive comprising:

an assembly base including a disc drive station configured to support an unassembled disc drive;

a plurality of assembly members operably coupled to the assembly base and including gripping members operable to selectively grip and release an assembly component and the assembly members movable in unison between a load position and an install position aligned with the disc drive station, in the load position, the gripping members gripping assembly components and in the install position, the gripping members releasing the assembly components to install the assembly components in the unassembled disc drive;

an operating device operating the gripping members to grip the assembly components in the load position and moving the assembly members in unison from the load position to the install position with the gripping members gripping the assembly components and operating the gripping members in the install position to release the assembly components for installation of the assembly components; and a controller operably coupled to the operating device to synchronously operate the assembly members between the load position and the install position.

2. The assembly device of claim 1 wherein at least three assembly members are included.

3. The assembly device of claim 1 wherein the operating device includes:
- an x-axis operating device coupled to the assembly members to move the assembly members along an x-axis between a component station, supporting a plurality of components for installation, and the disc drive station; and
- a z-axis operating device coupled to the assembly members to move the assembly members between a lower position and an elevated position to operate between the load position and the install position.

4. The assembly device of claim 1 wherein the assembly members operate between a component station, supporting a plurality of components for installation, and the disc drive station, and the operating device includes:
- a track coupled to the assembly base and having a slide movably supported thereon and adapted to move between the component station and the disc drive station, operation of the slide being controlled by the controller;
- a lift block operably coupled to the slide and movable therewith, and including a lift moveable along a track of the lift block transverse to the movement of the slide, operation of the lift being controlled by the controller; and
- the assembly members being operably coupled to the lift and concurrently moved thereby, said lift supporting the assembly members above the disc drive station and the component station in an elevated position, and operable to a lower position to load and to install the assembly components in the unassembled disc drive.

5. The assembly device of claim 1 wherein the plurality of assembly members includes a latch assembly member adapted to assemble a latch assembly for an actuator block of the unassembled disc drive.

6. The assembly device of claim 1 wherein the plurality of assembly members includes a filter housing assembly member adapted to assemble a filter housing of the unassembled disc drive.

7. The assembly device of claim 1 wherein the plurality of assembly members includes a magnet-and-backiron assembly member adapted to assemble a magnet-and-backiron assembly relative to a coil bobbin for constructing a voice coil motor of the unassembled disc drive.

8. The assembly device of claim 1 wherein the plurality of assembly members includes a latch assembly member, a filter housing assembly member and a magnet-and-backiron assembly member.

9. The assembly device of claim 1 wherein the unassembled disc drive is supported along a conveyor movable along a conveyor path spaced from the disc drive station and including a disc drive transport operable between the conveyor and the disc drive station to move the unassembled disc drive from the conveyor to the disc drive station and from the disc drive station to the conveyor.

10. The assembly device of claim 4 wherein the plurality of assembly members are compliantly coupled relative to said lift via a slide movable along a track rigidly coupled to the lift to adjust the position of the assembly members relative to the lift to compensate for obstructions.

11. The assembly device of claim 6 wherein the filter housing assembly member includes fingers movably supported between a retracted position for insertion relative to posts of the filter housing, and a second expanded position to grip the posts to selectively grip and release the filter housing.

12. The assembly device of claim 5 wherein the latch assembly member includes fingers movably supported between a first spaced position and a second closed position to selectively grip and release the latch assembly.

13. The assembly device of claim 12 wherein the latch assembly member includes a pivot plate pivotally coupled relative to the assembly base, said fingers being coupled to said pivot plate and movable thereby between the install position and a locked position to align the latch assembly in the unassembled disc drive.

14. The assembly device of claim 7 wherein the magnet-and-backiron assembly member includes gripper arms movably supported to operate between an opened extended position and a closed gripping position to selectively grip and release the magnet-and-backiron assembly.

15. The assembly device of claim 14 wherein the gripper arms are operably coupled to a slide and are movable thereby to operate between a retracted position and an insertion position to align the magnet-and-backiron assembly supported via the gripper arms relative to a coil bobbin of the unassembled disc drive, and to advance the magnet-and-backiron assembly to insert the coil bobbin in a gap of the magnet-and-backiron assembly for installation.

16. The assembly device of claim 1 including a photosensor to detect obstructions, said photosensor being operably coupled to the controller to restrict operation when an obstruction is detected.

17. A method of assembling a disc drive comprising the steps of:
- positioning an unassembled disc drive relative to a disc drive station coupled to an assembly base, and aligning a latch base, filter housing and magnet-and-backiron assembly components in a predefined pattern in a component station;
- providing an assembly train including a latch assembly member, a filter housing assembly member and a magnet-and-backiron assembly member operable between the disc drive station and the component station;
- positioning the assembly train relative to the component station;
- operating the latch assembly member, the filter housing assembly member, and the magnet and backiron assembly member to engage the assembly components supported at the component station for transport via the assembly train;
- moving the assembly train with the assembly components supported thereby to the disc drive station and aligning the supported assembly components for installation; and
- disengaging the assembly components to install the assembly components in the unassembled disc drive.

18. An assembly device for assembling components of a disc drive comprising:
- a base including a disc drive station; and
- assembly means for assembling components in the disc drive, said assembly means being adapted to engage assembly components and transport assembly components for installation in the disc drive.

* * * * *